United States Patent [19]
Witt

[11] Patent Number: 5,623,619
[45] Date of Patent: Apr. 22, 1997

[54] LINEARLY ADDRESSABLE MICROPROCESSOR CACHE

[75] Inventor: David B. Witt, Austin, Tex.

[73] Assignee: Advanced Micro Devices, Inc., Sunnyvale, Calif.

[21] Appl. No.: 506,509

[22] Filed: Jul. 24, 1995

Related U.S. Application Data

[63] Continuation of Ser. No. 146,381, Oct. 29, 1993, abandoned.

[51] Int. Cl.$^6$ .................................................. G06F 12/10
[52] U.S. Cl. ........................ 395/403; 395/412; 395/800; 364/243.41; 364/256.5; 364/DIG. 1
[58] Field of Search .................................. 395/800, 403, 395/445, 474, 412; 364/243.41, 256.5, DIG. 1

[56] References Cited

U.S. PATENT DOCUMENTS

| | | | |
|---|---|---|---|
| 3,781,808 | 12/1973 | Ahearn et al. ........................ | 395/400 |
| 4,044,338 | 8/1977 | Wolf ........................................ | 395/425 |
| 4,155,119 | 5/1979 | DeWard et al. ........................ | 395/416 |
| 4,161,784 | 7/1979 | Cushing et al. ........................ | 364/748 |
| 4,179,737 | 12/1979 | Kim ....................................... | 395/375 |
| 4,384,343 | 5/1983 | Morganti et al. ...................... | 395/800 |
| 4,453,212 | 6/1984 | Gaither et al. ......................... | 395/402 |
| 4,736,288 | 4/1988 | Shintani et al. ....................... | 395/375 |
| 4,807,115 | 2/1989 | Torng ..................................... | 395/375 |
| 4,926,322 | 5/1990 | Stimac et al. .......................... | 395/500 |
| 4,928,223 | 5/1990 | Dao et al. ............................... | 395/375 |
| 4,992,934 | 2/1991 | Portanova et al. ..................... | 395/375 |
| 5,056,006 | 10/1991 | Acharya et al. ........................ | 395/474 |
| 5,133,062 | 7/1992 | Joshi et al. ............................. | 395/500 |
| 5,136,697 | 8/1992 | Johnson ................................. | 395/375 |
| 5,155,816 | 10/1992 | Kohn ..................................... | 395/496 |

(List continued on next page.)

FOREIGN PATENT DOCUMENTS

| | | |
|---|---|---|
| 0140533A3 | 5/1985 | European Pat. Off. . |
| 0170525A2 | 2/1986 | European Pat. Off. . |
| 0259095A2 | 3/1988 | European Pat. Off. . |
| 0459232A2 | 12/1991 | European Pat. Off. . |
| 2260429 | 4/1993 | United Kingdom . |
| 2281422 | 3/1995 | United Kingdom . |

OTHER PUBLICATIONS

IBM Technical Disclosure Bulletin, vol. 25, No. 12, May 1984, pp. 6264–6265.

Gurindar S. Sohi, "Instruction Issue Logic for High-Performance, Interruptible, Multiply Functional Unit, Pipelined Computers", IEEE Transactions on Computers, vol. 39, No. 3, ©1990, pp. 349–359.

Robert B. K. Dewar, et al., "Microprocessors A Programmer's View", 1990, Chapter 4, pp. 103–134.

David A. Patterson, et al., "Computer Architecture A Quantitive Approach", Chapter 8, 1990, pp. 403–497.

Michael Slater, "AMD's K5 Designed to Outrun Pentium", Microprocessor Report, Oct. 24, 1995, pp. 1, 6–11.

Brian Case, "AMD Unveils First Superscalar 29K Core", Microprocessor Report, Oct. 24, 1994, pp. 23–26.

Toyohiko Yoshida, et al., "The Approach to Multiple Instruction Execution in the GMICRO/400 Processor", ©1991, pp. 185–195.

Tom R. Halfhill, "AMD K6 Takes On Intel P6", BYTE magazine, Jan. 1996, pp. 67–68, 70 and 72.

*Primary Examiner*—Eric Coleman
*Assistant Examiner*—John Harrity
*Attorney, Agent, or Firm*—Skjerven, Morrill, MacPherson, Franklin & Friel; Stephen A. Terrile

[57] ABSTRACT

A microprocessor conforming to the X86 architecture is disclosed which includes a linearly addressable cache, thus allowing the cache to be quickly accessed by an external bus while allowing fast translation to a logical address for operation with functional units of microprocessor. Also disclosed is a microprocessor which includes linear tag array and a physical tag array corresponding to the linear tag array, thus allowing the contents of a microprocessor cache to be advantageously monitored from an external bus without slowing the main instruction and data access processing paths.

45 Claims, 8 Drawing Sheets

U.S. PATENT DOCUMENTS

| | | | |
|---|---|---|---|
| 5,155,820 | 10/1992 | Gibson | 395/375 |
| 5,185,868 | 2/1993 | Tran | 395/375 |
| 5,201,056 | 4/1993 | Daniel et al. | 395/800 |
| 5,222,230 | 6/1993 | Gill et al. | 395/550 |
| 5,226,126 | 7/1993 | McFarland et al. | 395/375 |
| 5,226,130 | 7/1993 | Favor et al. | 395/375 |
| 5,233,694 | 8/1993 | Hotta et al. | 395/375 |
| 5,233,696 | 8/1993 | Suzuki | 395/375 |
| 5,274,790 | 12/1993 | Suzuki | 395/460 |
| 5,325,499 | 6/1994 | Kummer et al. | 395/470 |
| 5,390,355 | 2/1995 | Horst | 395/800 |
| 5,454,117 | 9/1995 | Puziol et al. | 395/800 |
| 5,467,473 | 11/1995 | Kahle et al. | 395/800 |
| 5,473,348 | 12/1995 | Fujimoto | 345/200 |

LINEARLY ADDRESSABLE MICROPROCESSOR CACHE

This application is a continuation of application Ser. No. 08/146,381, filed Oct. 19, 1993, now abandoned.

BACKGROUND OF THE INVENTION

The present invention relates to microprocessors, and, more particularly, to providing microprocessors with high performance caches.

Microprocessors have attained wide-spread use throughout many industries. A goal of any microprocessor is to process information quickly. One technique which is used to increase the speed with which the microprocessor processes information is to provide the microprocessor with an architecture which includes a fast local memory called a cache.

A cache is used by the microprocessor to temporarily store instructions and data. A cache which stores both instructions and data is referred to as a unified cache; a cache which stores only instructions is an instruction cache and a cache which stores only data is a data cache. Providing a microprocessor architecture with either a unified cache or an instruction cache and a data cache is a matter of design choice.

One microprocessor architecture that has gained widespread acceptance is the X86 architecture. This architecture, first introduced in the i386™ microprocessor, is also the basic architecture of both the i486™ microprocessor and the Pentium™ microprocessor, all available from the Intel corporation of Santa Clara, Calif. The X86 architecture provides for three distinct types of addresses, a logical (i.e., virtual) address, a linear address and a physical address.

The logical address represents an offset from a segment base address. The segment base address is accessed via a selector. More specifically, the selector, which is stored in a segment register, is an index which points to a location in a global descriptor table (GDT). The GDT location stores the linear address corresponding to the segment base address.

The translation between logical and linear addresses depends on whether the microprocessor is in Real Mode or Protected Mode. When the microprocessor is in Real Mode, then a segmentation unit shifts the selector left four bits and adds the result to the offset to form the linear address. When the microprocessor is in Protected Mode, then the segmentation unit adds the linear base address pointed to by the selector to the offset to provide the linear address.

The physical address is the address which appears on the address pins of the microprocessor and is used to physically address external memory. The physical address does not necessarily correspond to the linear address. If paging is not enabled then the 32-bit linear address corresponds to the physical address. If paging is enabled, then the linear address must be translated into the physical address. A paging unit, which is usually included as part of the microprocessor's memory management unit, performs this translation.

The paging unit uses two levels of tables to translate the linear address into a physical address. The first level table is a Page Directory and the second level table is a Page Table. The Page Directory includes a plurality of page directory entries; each entry includes the address of a Page Table and information about the Page Table. The upper 10 bits of the linear address (A22–A31) are used as an index to select a Page Directory Entry. The Page Table includes a plurality of Page Table entries; each Page Table entry includes a starting address of a page frame and statistical information about the page. Address bits A12–A21 of the linear address are used as an index to select one of the Page Table entries. The starting address of the page frame is concatenated with the lower 12 bits of the linear address to form the physical address.

Because accessing two levels of table for every memory operation substantially affects performance of the microprocessor, the memory management unit generally also includes a cache of the most recently accessed page table entries, this cache is called a translation lookaside buffer (TLB). The microprocessor only uses the paging unit when an entry is not in the TLB.

The first processor conforming to the X86 architecture which included a cache was the 486 processor, which included an 8 Kbyte unified cache. The Pentium™ processor includes separate 8 Kbyte instruction and data caches. The 486 processor cache and the Pentium™ processor caches are accessed via physical addresses; however, the functional units of these processors operate with logical addresses. Accordingly, when the functional units require access to these caches, the logical address must be converted to a linear address and then to a physical address.

In microprocessor architectures other than the X86 architecture, it is known to use virtually addressed caches to eliminate the address translation time from a cache hit. However, because input output devices (I/O) use physical addresses, mapping is required for the I/O to interact with the cache. In these systems, there are generally only two levels of addressing, virtual and physical, and thus only a single translation is required for the physically addressed I/O devices to interact with the virtually addressed cache. Additionally, with a virtually addressed cache, every time a process is switched, the virtual addresses refer to different physical addresses, and thus, the cache must be flushed as the virtually addressed cache entries are potentially invalid. Additionally, with a virtually addressed cache, it is possible for two different virtual addresses to correspond to the same physical address. These duplicate addresses are called aliases and could result in two locations in a virtual cache having information from the same physical address, the information in only one of the locations being modified.

SUMMARY OF THE INVENTION

It has been discovered that by providing a microprocessor conforming to X86 architecture with a linearly addressable cache, the cache may be quickly accessed by an external bus while allowing fast translation to a logical address for operation with the functional units of microprocessor. Additionally, it has been discovered that by providing a linear tag array and a physical tag array corresponding to the linear tag array, the contents of a microprocessor cache may be advantageously monitored from an external bus without slowing the main instruction and data access processing paths.

In one embodiment, the present invention relates to a processor for processing information, the processor interacting with a device external to the processor using physical addresses. The processor includes a plurality of functional units, a cache for temporarily storing information for use by the plurality of functional units, a first translation circuit for translating between physical addresses and linear addresses to allow the device external to the processor to communicate with the cache and a second translation circuit for translating between linear addresses and logical addresses to allow the functional units to communicate with the cache. The functional units are addressed using logical addresses and the cache is addressed using linear addresses.

The present invention advantageously provides a cached system in which there is no delay in translating to an external physical address from the cache's linear address, there is no delay in translating from the cache's linear address to the instruction pointer's logical address, stalling is not required for external bus watching because only physical tags are checked, invalidation is not required on segment update, the linear tags need not be invalidated upon update of the TLB, and the system uses a single unified TLB.

DETAILED DESCRIPTION OF THE INVENTION

The following sets forth a detailed description of the best contemplated mode for carrying out the invention. The description is intended to be illustrative of the invention and should not be taken to be limiting.

Figure 1:
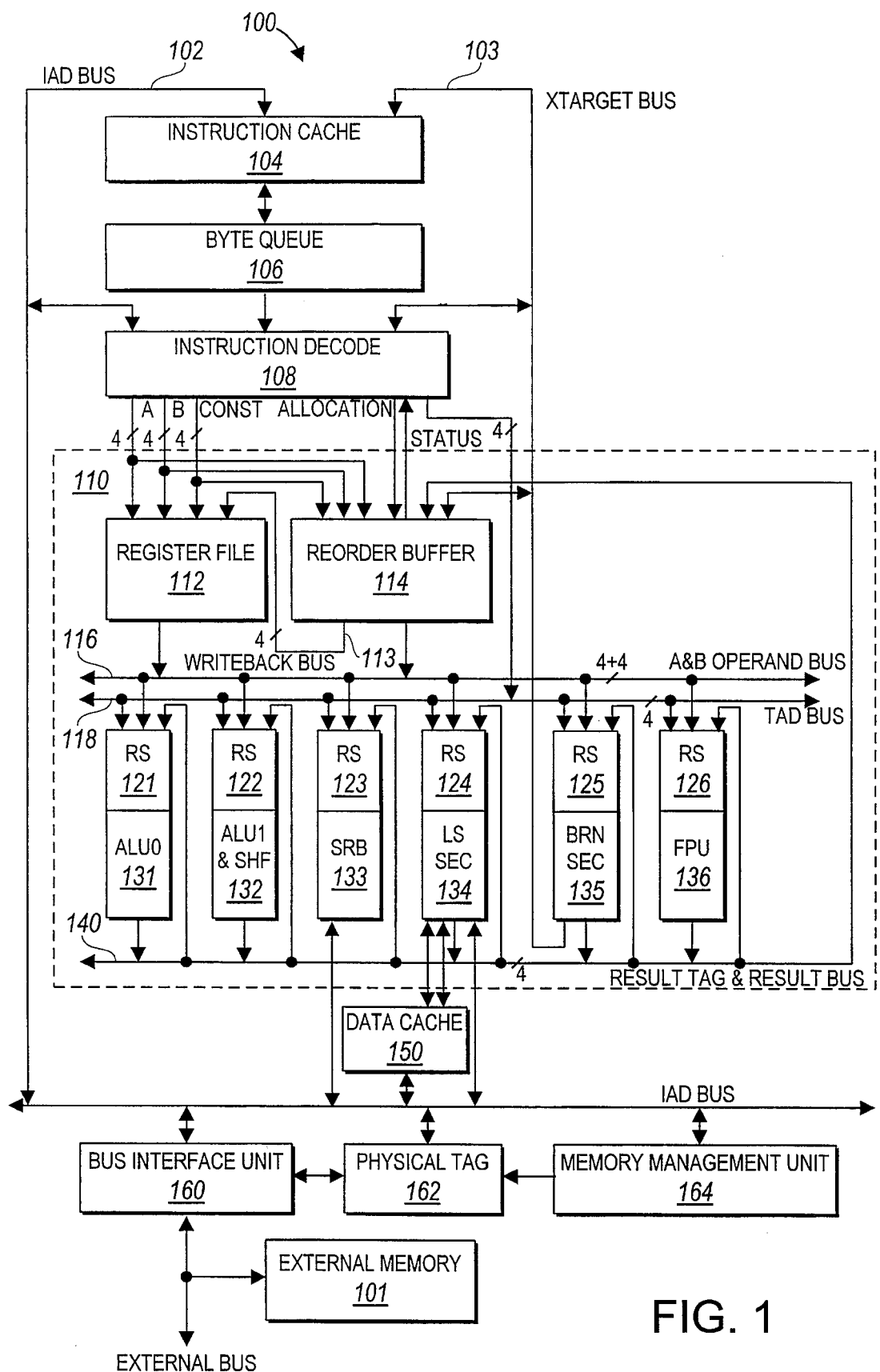
FIG. 1 is a block diagram of a microprocessor in accordance the present invention.

Referring to FIG. 1, the present invention can be best understood in the context of superscalar X86 microprocessor 100 which executes the X86 instruction set. Microprocessor is coupled to physically addressed external memory 101 via a 486 XL bus or other conventional microprocessor bus. Microprocessor 100 includes instruction cache 104 which is coupled to internal address and data (IAD) bus 102 and XTARGET bus 103 as well as to byte queue 106 which is coupled to instruction decoder 108. Instruction decoder 108 is coupled to RISC core 110. RISC core 110 includes register file 112 and reorder buffer 114 as well as a variety of functional units such as arithmetic logic unit 131 (ALU0), arithmetic logic and shift unit 132 (ALU1 & SHF), special register block 133 (SRB), load/store functional unit 134 (LSSEC), branch section 135 (BRNSEC), and floating point unit 136 (FPU).

RISC core 110 includes A and B operand buses 116, type and dispatch (TAD) bus 118 and result tag and result bus 140 which are coupled to the functional units. A and B operand buses 116 are also coupled to register file 112 and reorder buffer 114. TAD bus 118 is also coupled to instruction decoder 108. Result bus 140 is also coupled to reorder buffer 114. Additionally, branch section 135 is coupled to reorder buffer 114, instruction decoder 108 and instruction cache 104 via Xtarget bus 103.

In addition to instruction cache 104, microprocessor 100 also includes data cache 150 (DCACHE) and physical tag circuit 162. Data cache 150 is coupled to Load/store functional unit 134 of the RISC core and with IAD bus 102. Physical tag circuit 162 interacts with both instruction cache 104 and data cache 150 via IAD bus 102. Instruction cache 104 and data cache 150 are both linearly addressable caches. Instruction cache 104 and data cache 150 are physically separate, however, both caches are organized using the same architecture, i.e., both caches include a store array along with a corresponding tag array.

Microprocessor 100 also includes memory management unit (MMU) 164 and bus interface unit 160 (BIU). Memory management unit 164 is coupled with IAD bus 102 and physical tag circuit 162. Bus interface unit 160 is coupled to physical tag circuit 162 and IAD bus 102 as well as an external microprocessor bus such as the 486 XL bus.

Microprocessor 100 executes computer programs which include sequences of instructions. Computer programs are typically stored on a hard disk, floppy disk or other non-volatile storage media which are located in the computer system. When the program is run, the program is loaded from the storage media into main memory 101 which is accessed by microprocessor 100 via bus interface unit 160. Once the instructions of the program and associated data are in main memory 101, individual instructions are prepared for execution and ultimately executed by microprocessor 100.

After being stored in main memory 101, the instructions are passed via bus interface unit 160 to instruction cache 104, where the instructions are temporarily held. Instruction decoder 108 receives the instructions from instruction cache 104 via byte queue 106, which aligns and buffers the instructions. Instruction decoder 108 examines the instructions and determines the appropriate action to take. For example, decoder 108 may determine whether a particular instruction is a PUSH, POP, LOAD, AND, OR, EX OR, ADD, SUB, NOP, JUMP, JUMP on condition (BRANCH) or other instruction. Depending on which particular instruction that decoder 108 determines is present, the instruction is dispatched to the appropriate functional unit of RISC core 110.

The instructions which are dispatched to RISC core 110 typically include multiple fields in the following format: OP CODE, OPERAND A, OPERAND B, DESTINATION REGISTER. For example, the instruction ADD A, B, C means add the contents of register A to the contents of register B and place the result in register C.

The OP CODEs are provided from instruction decoder 108 to the functional units of RISC core 110 via type and dispatch (TAD) bus 118. Not only must the OP CODE for a particular instruction be provided to the appropriate functional unit, but also the designated OPERANDs for the instruction must be retrieved and sent to the functional unit. If the value of a particular operand is stored in main memory 101, then this value is retrieved and stored in data cache 150. This value may then be loaded by load store section 134 to be provided to reorder buffer 114. Alternately, if the value of a particular operand has not yet been calculated, then that value must be first calculated and provided to the functional unit before the functional unit can be executed. For example, if a current instruction is dependent on a prior instruction, the result of the prior instruction must be determined before the current instruction can be executed. This situation is referred to as a dependency.

The operands which are needed for a particular instruction to be executed by a functional unit are provided by either register file 112 or reorder buffer 114 to the operand bus. The operand bus conveys the operands to the appropriate functional units. Once a functional unit receives the OP CODE, OPERAND A, and OPERAND B, the functional unit executes the instruction and places the result on a result bus 140, which is coupled to the outputs of all of the functional units and to reorder buffer 114.

Reorder buffer 114 is managed as a first in first out (FIFO) device. When an instruction is decoded by instruction decoder 108, a corresponding entry is allocated in reorder buffer 114. The result value computed by the instruction is then written into the allocated entry when the execution of the instruction is completed. The result value is subsequently written into register file 112 and the instruction retired if there are no exceptions associated with the instruction and if no speculative branch is pending which affects the instruction. If the instruction is not complete when its associated entry reaches the head of the reorder buffer 114, the advancement of reorder buffer 114 is halted until the instruction is completed. Additional entries, however, can continue to be allocated.

Each functional unit includes respective reservation stations (RS) 121–126 for storing OP CODEs from instructions which are not yet complete because operands for that instruction are not yet available to the functional unit. Each reservation station stores the instruction's OP CODE together with tags which reserve places for the missing operands that will arrive at the reservation station later. This technique enhances performance by permitting microprocessor 100 to continue executing other instructions while the pending instruction is being assembled with its operands at the reservation station.

Microprocessor 100 affords out of order issue by isolating decoder 108 from the functional units of RISC core 110. More specifically, reorder buffer 114 and the reservation stations of the functional units effectively establish a distributed instruction window. Accordingly, decoder 108 can continue to decode instructions even if the instructions can not be immediately executed. The instruction window acts as a pool of instructions from which the functional units draw as they continue to go forward and execute instructions. The instruction window thus provides microprocessor 100 with a look ahead capability. When dependencies are cleared and as operands become available, more instructions in the window are executed by the functional units and the decoder continues to fill the window with yet more decoded instructions.

Microprocessor 100 uses branch section 135 of the RISC core to enhance its performance. Because when a branch occurs, the next instruction depends upon the result of the branch, branches in the instruction stream of a program hinder the capability of the microprocessor to fetch instructions. Accordingly, predicted branches, which are predicted using information which is stored in a successor array of instruction cache 104, are executed by branch section 135. Branch section 135 then examines the results of the branch to determine whether the predicted branch was correct. If there is an exception or branch misprediction, then the contents of reorder buffer 114 allocated subsequent to the mispredicted branch instruction are discarded.

Figure 2:
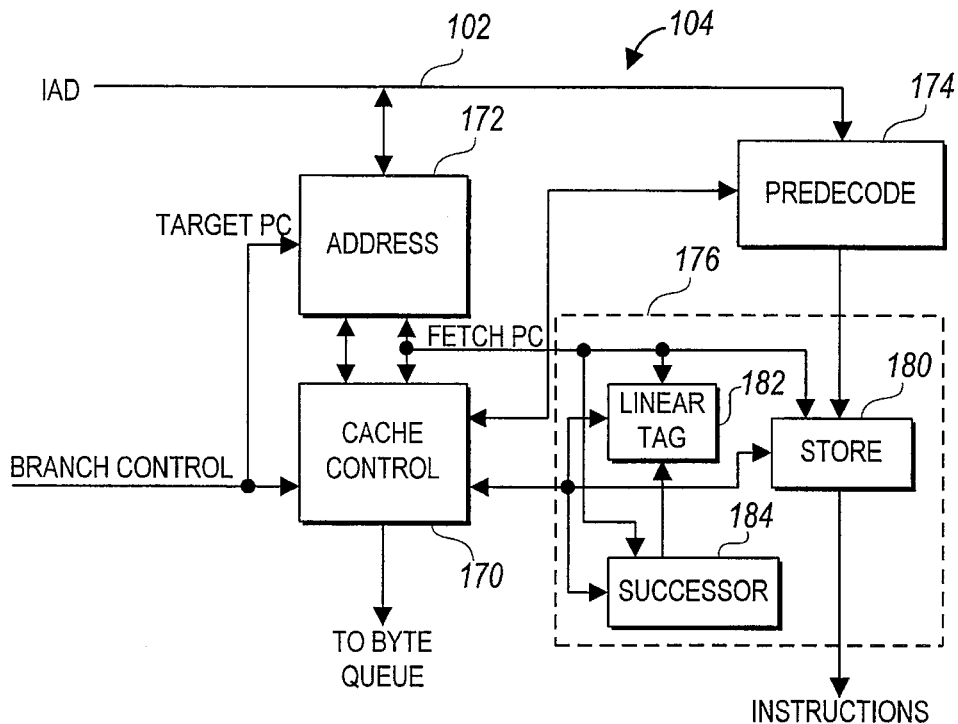
FIG. 2 is a block diagram of a linearly addressed instruction cache in accordance with the present invention.

Referring to FIG. 2, a description of instruction cache 104 with reference to the present invention is presented; co-filed application entitled "Pre-Decoded Instruction Cache and Method Therefor Particularly Suitable for Variable Byte-Length Instructions", which is incorporated by reference, sets forth the structure and operation of instruction cache 104 in greater detail. Instruction cache 104 is a linearly addressed 16 Kbyte 4-way set associative cache. Each set includes 256 entries; each entry includes a sixteen byte instruction block, a linear address tag and next predicted executed branch information. Instruction cache 104 includes cache controller 170, address circuit 172, predecode circuit 174 and cache array 176. Cache controller 170 provides control signals to orchestrate the various operations of instruction cache 104. Address circuit 172 generates a linear fetch program counter (FETCH PC) based upon a logical target program counter which is received from branch section 135; address circuit 172 also provides address generation and X86 protection checking associated with pre-fetching instructions from external memory. Address circuit 172 functions as a translation circuit for translating between logical addresses and linear addresses. Predecode circuit 174 receives pre-fetched x86 instruction bytes via IAD bus 102, assigns predecode bits for each x86 instruction byte and writes the predecoded x86 instruction bytes into cache array 176. Cache array 176 stores instructions received from predecode circuit 174 and provides these instructions to byte queue 106 when addressed by the linear FETCH PC signal.

Cache array 176 is organized into three main arrays, instruction cache store array 180, linear tag array 182 and successor array 184. Instruction cache store array 180 stores the 16 byte instructions. Linear tag array 182 stores the linear address tags corresponding to the instructions. Successor array 184 stores predicted branch information, which is used to support branch prediction, corresponding to the instructions. Each of these arrays is addressed by the linear FETCH PC address which is provided by address circuit 172.

Figure 3:
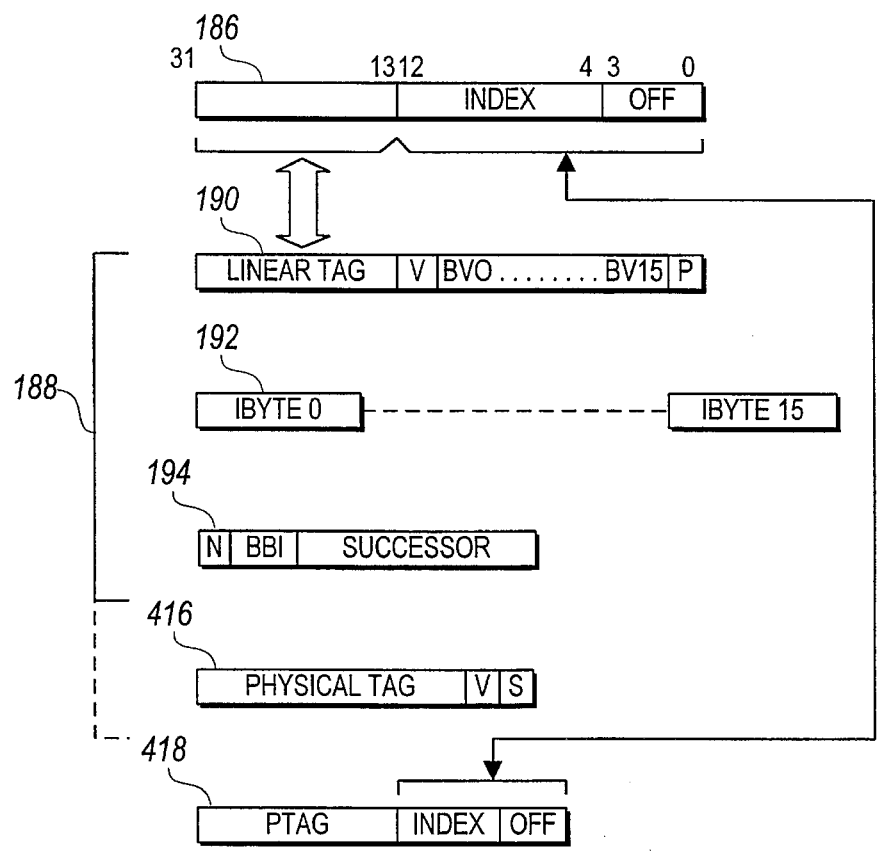
FIG. 3 is a block diagram of an entry of the FIG. 2 instruction cache along with the corresponding linear and physical addresses.

Referring to FIG. 3, the upper order bits of the linear FETCH PC address 186 are compared to the tags stored within linear tag array 182; these bits are stored as a linear tag when an entry is stored in cache array 176. The middle order bits of the FETCH PC address 186 provide a cache index which is used to address a block within the array and retrieve an entry from the block of the array. The lowest order bits provide an offset in the retrieved entry from BYTE0 of the instruction block which is stored in instruction store array 180; thus accessing the actual byte addressed by the FETCH PC address.

Instruction cache entry 188 of cache 104 includes linear address tag entry 190, instruction entry 192 and predicted branch entry 194. Instruction entry 192 includes a sixteen byte (IBYTE0–IBYTE 15) block of instructions. Linear address tag entry 190 includes a linear tag value (LTAG), linear tag valid bit (TV), sixteen byte valid bits (BV0–BV15) and valid physical translation bit (P). The linear tag value, which corresponds to the upper 20 bits of the linear FETCH PC address, indicates the linear block frame address of a block that is stored in the corresponding store array entry. The linear tag valid value indicates whether or not the linear tag value is valid. Each byte valid bit indicates whether the corresponding byte of the sixteen byte instruction entry is valid. The valid physical translation bit indicates whether or not an entry provides a successful physical tag hit.

Predicted branch entry 194 includes non-sequential bit (N), a 4-bit branch block index (BBI), and a 14-bit successor index. The non-sequential bit indicates, when asserted, a predicted-taken branch within the current block of instructions. The branch block index indicates, when the non-sequential bit is asserted, the byte offset within the current block of the last predicted-executed instruction byte. The successor index indicates, when the non-sequential bit is asserted, the index (8-bits) of the subsequent cache block to be accessed, the column (2-bits) of the subsequent cache block to be accessed, and the byte offset (4-bits) within the block of the next instruction predicted to be executed. I.e., the branch block index indicates the last byte of the predicted-taken branch instruction within the current block, while the successor index indicates where the next predicted-executed instruction is located within the cache.

Figure 4:
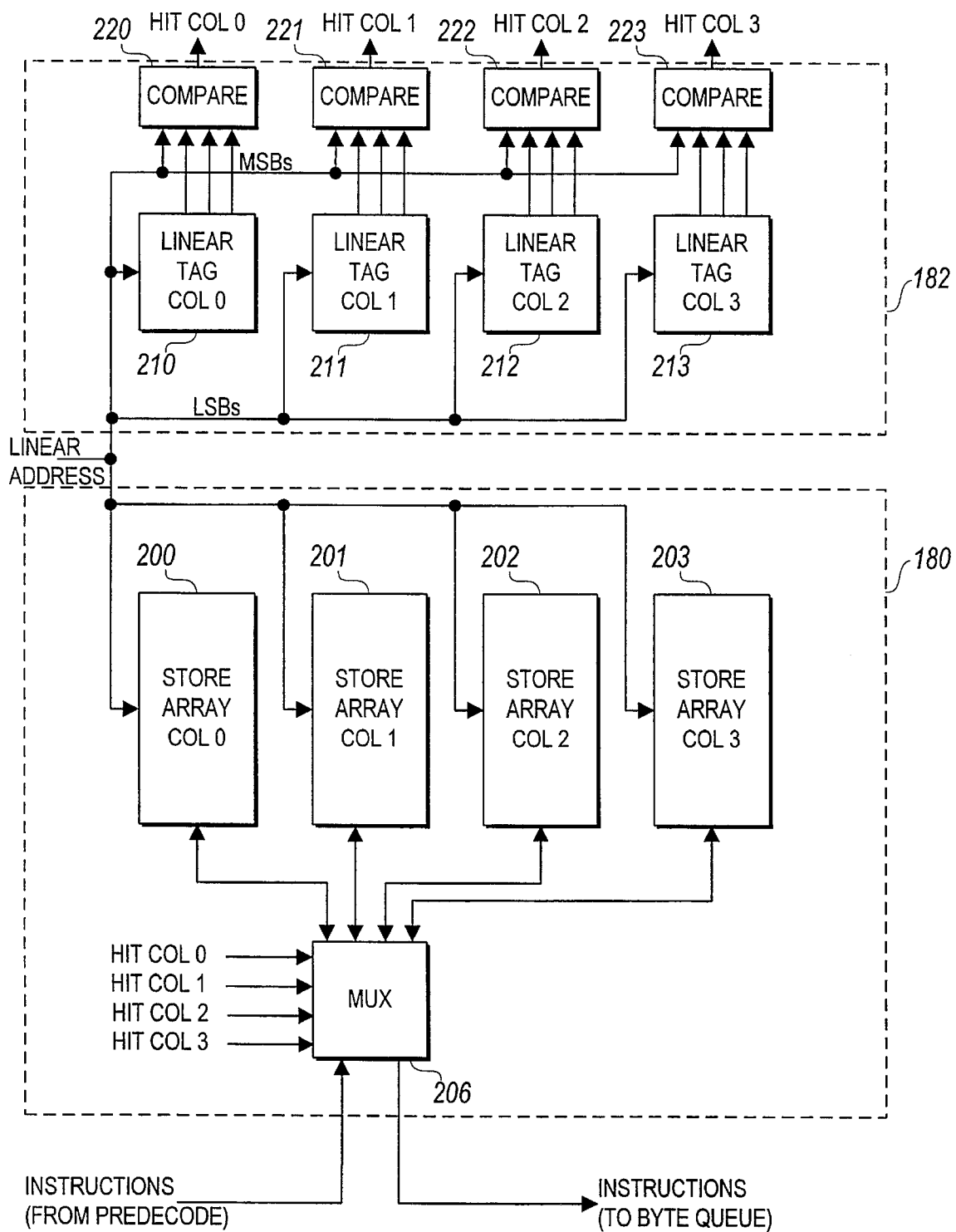
FIG. 4 is a block diagram of a linear tag array and a store array of the FIG. 2 instruction cache.

Referring to FIG. 4, linear tag array 182 and instruction store array 180 of linearly addressable instruction cache 104 are shown. Instruction cache 104 is arranged in four 4-Kbyte columns, column 0, column 1, column 2 and column 3, corresponding to the four sets of instruction cache 104. Instruction store array 180 includes four separate store arrays, column 0 store array 200, column 1 store array 201, column 2 store array 202 and column 3 store array 203 as well as multiplexer (MUX) circuit 206. Multiplexer 206 receives column hit indication control signals from linear tag array 182 which indicate whether there was a match to a linear tag value stored in the linear tag array and provides the instruction which is stored in one of the columns of the store arrays as output; multiplexer 206 also receives instructions for storing in store arrays 200–203 from predecode circuit 174 and provides these instructions based upon the control signals from address tag array 182.

Address tag array 182 includes linear tag arrays 210–213 corresponding to columns 0–3. Linear tag arrays 210–213 are organized with the same set and block configuration as store arrays 200–203. Linear tag arrays 210–213 each include a plurality of linear tag entries corresponding to the entries of respective store arrays 200–203. Each linear tag array is coupled with a respective compare circuit 220–223 which provide a respective column hit indication signal (COL HIT0–COL HIT3). Accordingly, each column of instruction cache 104 includes a store array, a linear tag array and a compare circuit. Store arrays 200–203, address tag arrays 210–211, and compare circuits 220–223 all receive the linear address FETCH PC from address circuit 172.

Figure 5:
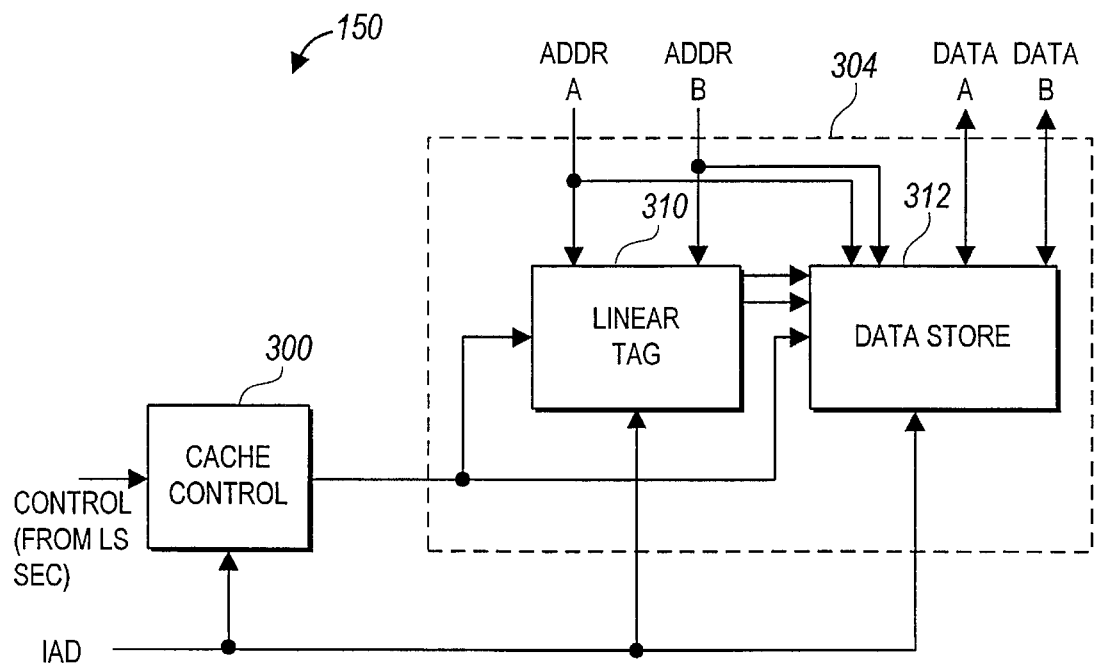
FIG. 5 is a block diagram of a linearly addressed data cache is accordance with the present invention.

Referring to FIG. 5, a description of data cache 150 with reference to the present invention is presented; co-filed application entitled "High Performance Load/Store Functional Unit and Data Cache", which is incorporated by reference, sets forth the structure and operation of data cache 150 in greater detail. Data cache 150 is a linearly addressed 8 Kbyte 4-way set associative cache. Each set of data cache 150 includes 128 entries; each entry includes a sixteen byte block of information. Data cache 150 includes data cache controller 300 and data cache array 304. Data cache controller 300 provides control signals to orchestrate the various operations of data cache 104. Data cache controller 300 receives control signals (CONTROL) from load store section 134 as well as from IAD bus 102; data cache controller 300 provides control signals to cache array 304. Cache array 304 stores data in blocks and provides the blocks of data when a particular block is addressed. Data cache array 304 is also coupled with IAD bus 102; in addition to the control signals from cache controller 300, data cache array receives address signals and data signals from load store section 134.

Data cache array 304 is organized into two arrays, data store array 312 and data linear tag circuit 310. Data store array 312 receives and provides two data signals (DATA A, DATA B) to load/store functional unit 134. Data linear tag circuit 310 is addressed by two linear addresses (ADDR A, ADDR B) which are provided by load/store functional unit 134; the two linear addresses are also provided to data store array 312. Accordingly, data cache array 304 is a dual ported memory array, both ports being coupled with load/store functional unit 134 to allow two data values to be written or read simultaneously. Data store array 312 also receives control signals from linear tag array 310.

Figure 6:
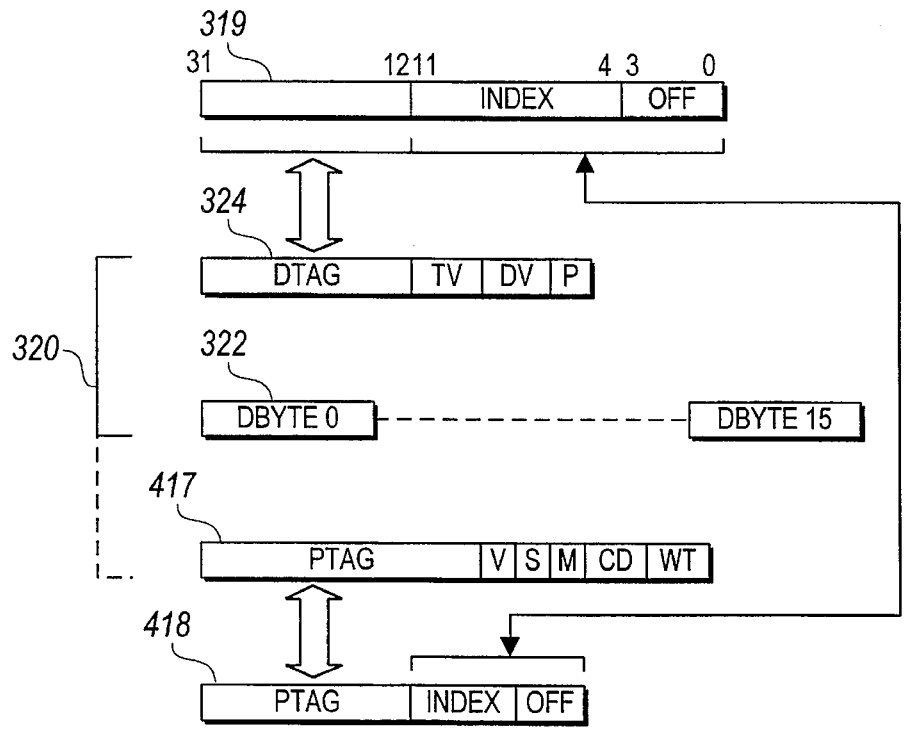
FIG. 6 is a block diagram of an entry of the data cache of FIG. 5 along with the corresponding linear and physical addresses.

Referring to FIG. 6, the middle order bits of each linear address 319 provide a cache block index (INDEX) which is used to address a block within each column of the linear tag arrays and retrieve an entry from each store array. The upper order bits of each linear address are compared to the linear data tags of each column of linear tag array 310, and thus select one of the columns which are accessed by the cache block index. The lowest order bits of each linear address provide an offset (OFF) into the retrieved entry to access the actual byte addressed by the linear address.

Data cache entry 320 of data cache 150 includes linear address tag entry 324 and data entry 322. Data entry 322 includes a sixteen byte (DBYTE0–DBYTE 15) block of data. Data linear address tag entry 324 includes a data linear tag value (DTAG), linear tag valid bit (TV), a data valid bit (DV), and valid physical translation bit (P). The data linear tag value, which corresponds to the upper 21 bits of the linear address, indicates the linear block frame address of a block which is stored in the corresponding store array entry. The linear tag valid bit indicates whether or not the linear tag is valid. The data valid bit indicates whether or not a corresponding entry in store array is valid. The valid physical translation bit indicates whether or not an entry provides a successful physical tag hit as discussed below.

Figure 7:
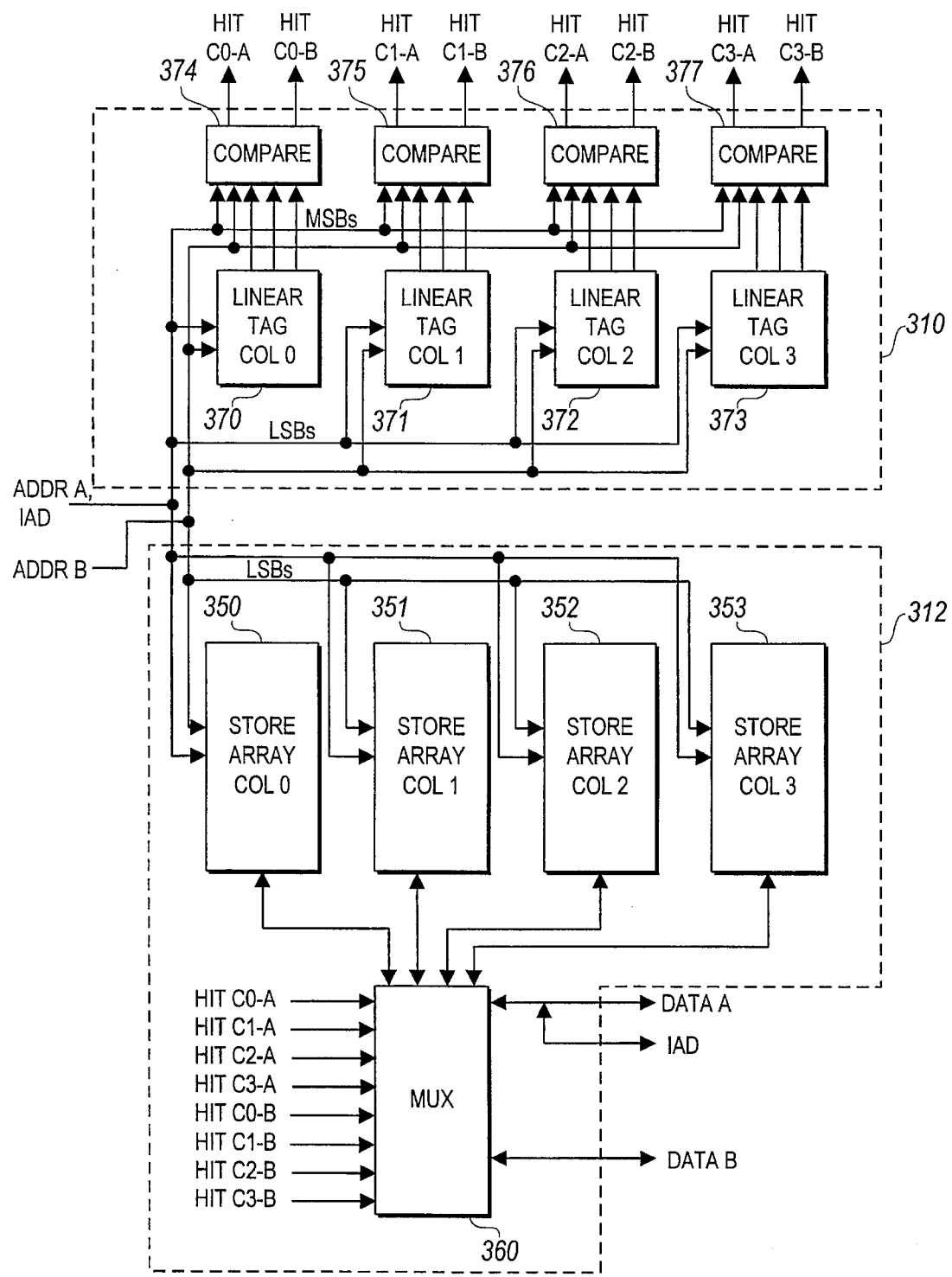
FIG. 7 is a block diagram of a linear tag array and a store array of the FIG. 5 data cache.

Referring to FIG. 7, data cache linear tag circuit 310 and data cache store array 312 of linearly addressable data cache 150 are shown. Data cache 150 is arranged in four 2-Kbyte columns, column 0, column 1, column 2, and column 3. The arrangement of data linear tag circuit 310 and data cache store array 312 are similar to that of instruction cache linear tag circuit 182 and store array 184. However, data linear tag circuit 310 simultaneously receives two linear addresses (ADDR A, ADDR B) and data store array 312 simultaneously receives and provides two data signals (DATA A, DATA B), i.e., data cache 150 functions as a dual ported data cache.

Data store array 312 includes four separate data store arrays, column 0 store array 350, column 1 store array 351, column 2 store array 352, and column 3 store array 353 as well as multiplexer (MUX) circuit 360. Multiplexer 360 receives control signals from data linear tag circuit 310 which indicate whether there is a match to a linear tag value stored in a respective linear tag array. Multiplexer 360 receives and provides the data to store arrays 350–353; multiplexer 360 also receives and provides the data to the IAD bus as well as load/store functional unit 134.

Linear tag circuit 310 includes linear tag arrays 370–373 corresponding to columns 0–3. Each linear tag array is coupled with a corresponding compare circuit 374–377. Accordingly each column of data cache 150 includes a store array, a linear tag array and a compare circuit. Store arrays 350–353, address tag arrays 370–373, and compare circuits 374–377 all receive the linear addresses, ADDR A, ADDR B from load/store functional unit 134.

Figure 8:
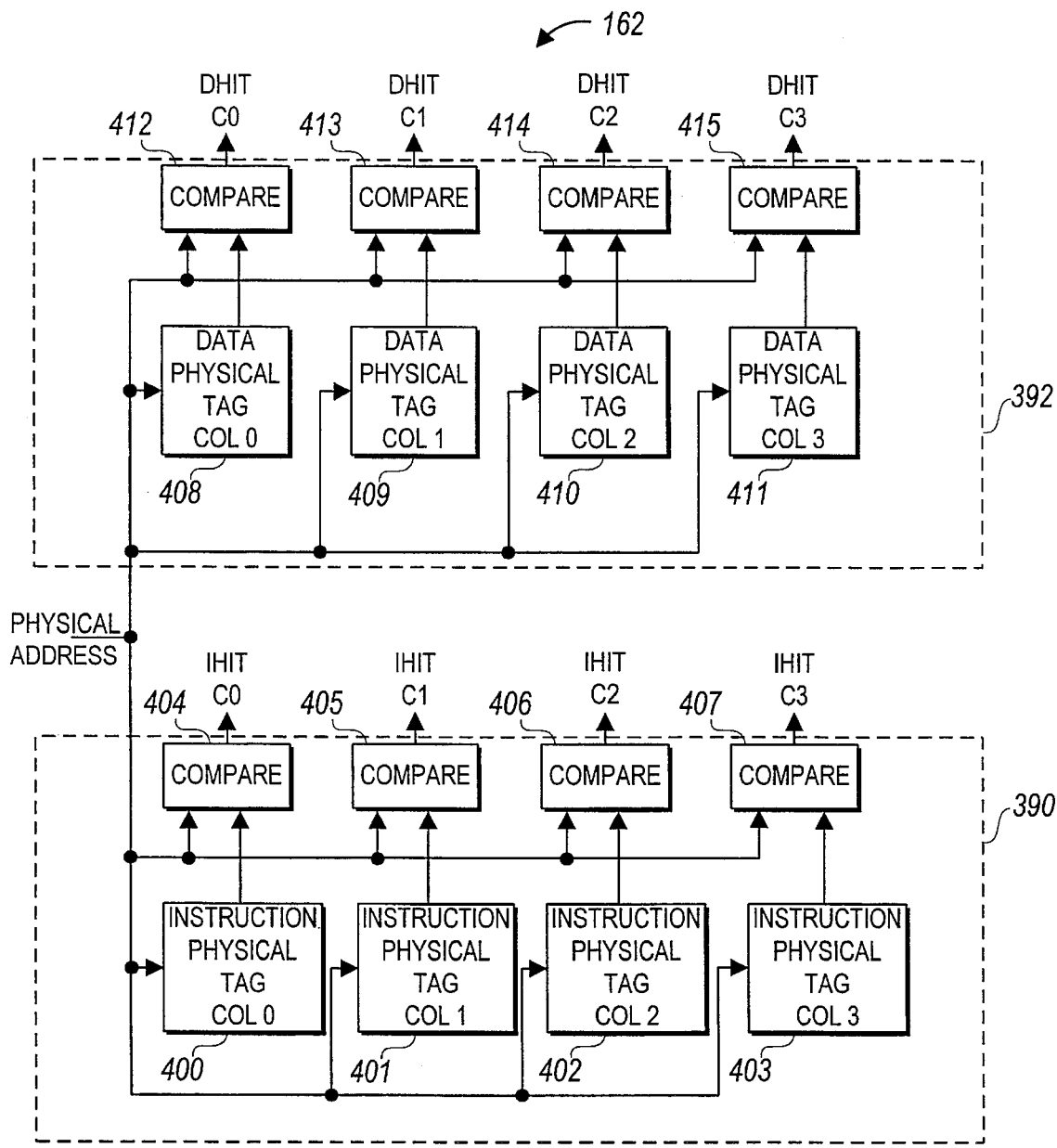
FIG. 8 is a block diagram of a physical tag circuit in accordance with the present invention.

Referring to FIG. 8, physical tag circuit 162 includes instruction physical tag array portion 390 and data physical tag array portion 392. Instruction physical tag array portion 390 includes a plurality of instruction physical tag arrays 400, 401, 402, 403 and a plurality of instruction compare circuits 404, 405, 406, 407. Data physical tag array portion includes a plurality of data physical tag arrays 408, 409, 410, 411 and a plurality of corresponding data compare circuits 412, 413, 414, 415. Instruction physical tag arrays 400–403 correspond to column 0–3 of instruction cache 104. Data physical tag arrays 408–411 correspond to columns 0–3 of data cache 150.

Instruction physical tag arrays 400–403 receive the least significant bits of the physical address that is provided by bus interface unit 160 and provide a respective physical tag to compare circuits 404–407, which also receive the most significant bits of the same physical address. Compare circuits 404–407 provide respective instruction column hit indication signals (IHIT C0–IHIT C3) to instruction store array 180. These instruction column hit indication signals are provided to the HIT COL inputs of multiplexer 206 to control which column store array provides an output instruction.

Data physical tag arrays 408–411 receive the least significant bits of the physical address that is provided by bus interface unit 160 and provide a respective data physical tag to compare circuits 412–415, which also receive the most significant bits of the same physical address. Compare circuits 412–415 provide respective data column hit indication signals (DHIT C0–DHIT C3) to data store array 312. These data column hit indication signals are provided to the HIT COL A inputs of multiplexer 360 to control which column store array provides an output instruction.

By providing physical tag arrays which are accessed separately from the store arrays, cache 150 is more efficient as it is not necessary to access store arrays 350–353, and thus to provide the power required to access these arrays, to access the physical tags during bus watching operations.

Referring to FIGS. 3, 6 and 8, physical tag arrays 400–403, 408–411 are organized with the same set and block relationship as their corresponding linear tag arrays. I.e., instruction physical tag arrays 400, 401, 402, 403 each include a plurality of instruction physical tag entries corresponding to the entries of instruction linear tag arrays 210, 211, 212, 213 of instruction cache 104 and data physical tag arrays 408, 409, 410, 411 include a plurality of data physical tag entries corresponding to the entries of linear tag arrays 370, 371, 372, 373 of data cache 150. Accordingly, each instruction physical tag entry 416 is conceptually included as part of instruction entry 188 and each data physical tag entry 417 is conceptually included as part of data entry 320.

Each physical tag entry 416, 417 includes a physical tag value (PTAG), a physical tag valid bit (PV), and a shared bit (S). Additionally, each data physical tag entry 417 also includes a modified bit (M), a cache disable bit (CD) and a write through bit (WT). The physical tag value indicates the physical address after translation from the linear address of the physical address 418 which corresponds to the information which is stored in the corresponding entry of the corresponding store array. The physical tag valid bit indicates whether or not the corresponding entry of the corresponding store array contains valid information. The shared bit indicates whether another cache elsewhere in a computer system of which processor 100 is a part has the same data. The modified bit indicates whether the data stored in the store array has been modified (i.e., written to) and therefore is not consistent with the corresponding data stored externally of the cache. The cache disable bit indicates whether this particular entry is cache disabled, i.e., cannot be stored in its respective cache. The write through bit indicates that when the entry is written to the cache, it should also be written to the entry's corresponding external memory location.

Figure 9:
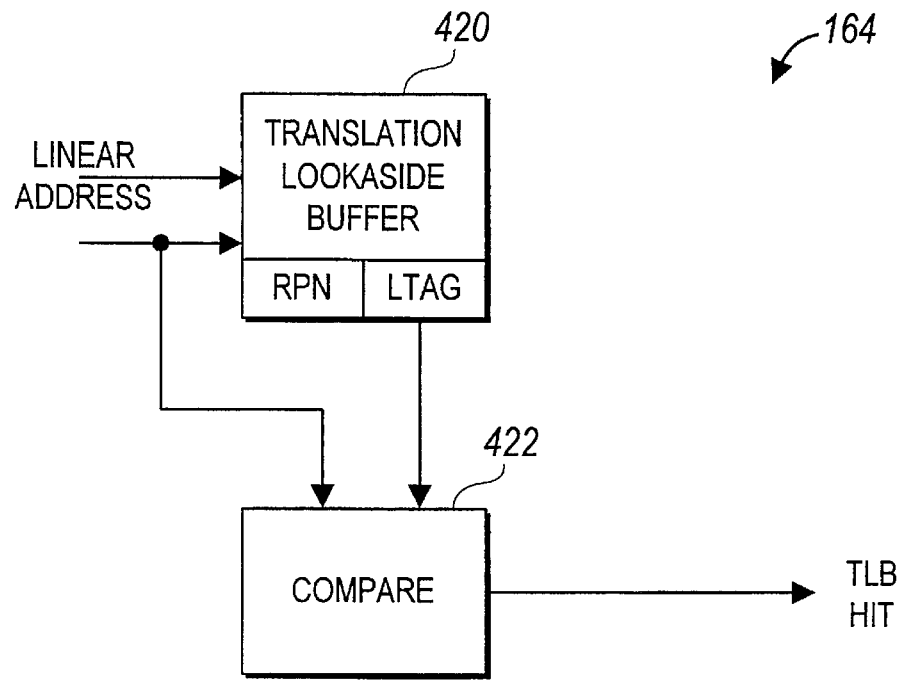
FIG. 9 is a block diagram of a translation lookaside buffer in accordance with the present invention.

Referring to FIG. 9, memory management unit 164 includes TLB array 420 as well as TLB compare circuit 422. TLB array 420 is organized as a 4 way set associative cache. Each set includes 32 entries to provide a total of 128 TLB entries. Memory management unit 164 functions as a translation circuit for translating between linear addresses and physical addresses.

Figure 10:
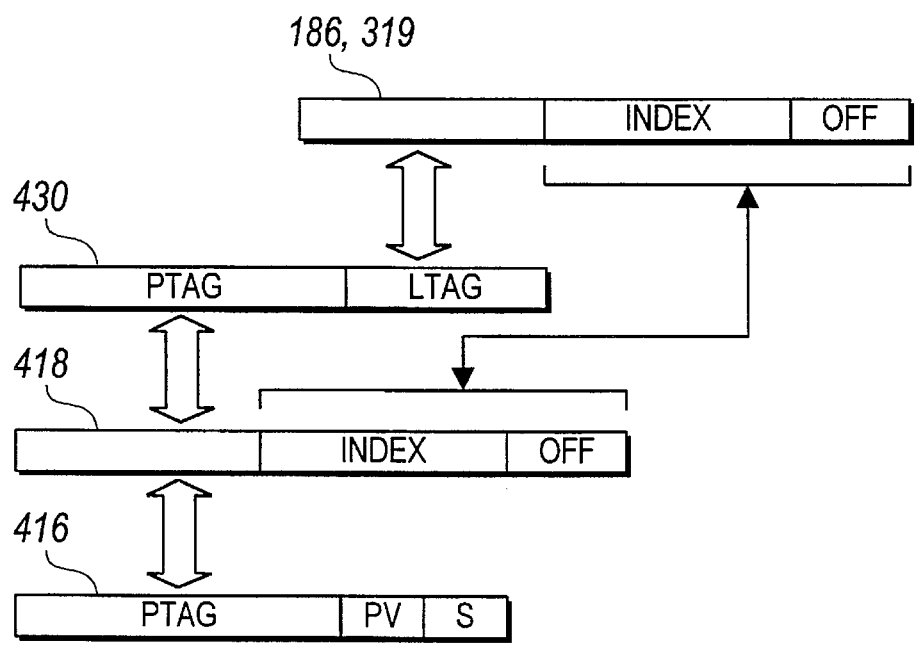
FIG. 10 is a block diagram of an entry of the physical tag circuit of FIG. 8 and an entry of the translation lookaside buffer of FIG. 9 along with the corresponding linear and physical addresses.

Referring to FIG. 10, each TLB entry 430 of TLB 164 includes a linear tag (LTAG) value and a physical tag (PTAG) value. The linear tag value corresponds to the most significant bits of a linear address 186 and physical tag value corresponds to the most significant bits of a physical address 418 that corresponds to linear address 186. By concatenating the physical tag value with the lower order bits of the linear address 186 which corresponds to the linear tag entry, the physical address is obtained without using two levels of page tables.

Referring to FIGS. 1–4, and 8–10, in operation, when an instruction that is not stored in cache 104 is requested by a branch section 135 then an instruction cache miss results. Upon detecting a cache miss, the requested instruction is loaded into an entry of instruction cache 104. More specifically, branch section 135 provides cache 104 with the linear address for the requested instruction. Thus branch section 135 functions as a logical to linear address translation circuit for addresses that are provided to instruction cache 104. Address circuit 172 checks the bounds of this linear address and provides a linear FETCH PC address. This linear FETCH PC address is provided by address circuit 172 to memory management unit 164 via IAD bus 102. The linear address of the instruction is checked against the linear tag portion of TLB array 420 by TLB compare circuit 422 to determine whether there is a TLB hit. If so, then upper bits of the physical address after translation from the corresponding linear address is written into the entry of instruction physical tag array portion 390 which corresponds to the column select bits and cache block index bits of the linear address. The instruction linear tag array entry 210–213 which corresponds to the column select bits of the linear tag and the cache block index of the linear address bits is written with the linear tag which corresponds to the linear tag which is stored in TLB array 420. If there is not a TLB hit, then TLB 420 is updated by memory management unit 164 to include the address translation of the requested instruction so that a TLB hit results by memory management unit 164 and then the real page number is written to instruction physical tag portion 390 as discussed.

A pre-fetch request is then made by address circuit 172 to the external memory and the value which is stored in the external memory at the physical address which corresponds to the linear address that is provided by branch section 135 is retrieved from the external memory. This value is stored in the line and column of store array 180 which corresponds to the line and column locations of the value's physical and linear tags which are stored in the respective physical and linear tag arrays. The corresponding physical tag valid bit in the physical tag array 390 is set to indicate that the entry corresponding to the physical tag is valid. The corresponding linear tag valid bit, byte valid bits, and valid physical translation bit in the linear tag array 182 are also set to indicate that the linear tag is valid, that the instruction byte entries stored in the store array are valid and that the entry provides a successful physical translation.

When the linear address for this instruction is again requested by branch section 135, address circuit 172 transforms the linear address to the linear FETCH PC address. Because this instruction has been stored in instruction cache 104, this linear FETCH PC address provides a match of the linear tags in address tag array 182. Because the byte valid bits are set and the valid physical translation bit is set, a linear address hit occurs, and the entry which is stored in the corresponding line of instruction store array 180 is forwarded to byte queue 106. During this access, there is no need to access either physical translation circuit 162 or memory management unit 164 since the valid physical translation bit is set indicating that the entry has a valid physical translation. This process is repeated for each instruction cache access unless TLB 420 is updated.

There is no need to perform a linear to physical translation with every instruction and data cache access because accesses to the cache use linear addresses. Thus, the linear to physical translation is not part of the cache access speed path. Accordingly, only one unified TLB is required to translate between physical and linear addresses for the instruction cache and the data cache.

When TLB 420 is updated, at least some of the mapping of the linear to physical addresses is changed. Accordingly, the tags which are stored in the linear tag circuits 182 and physical tag circuits 390, are potentially invalid. However, rather than flushing the information stored in instruction cache 104, instruction cache control circuit 170 uses the linear tag valid bit and the valid physical translation bit to determine whether a particular instruction cache entry 188 is invalid.

More specifically, when TLB 420 is updated, all of the valid physical translation bits of linear tag circuit 182 are cleared to indicate that the physical translation may be invalid; however, the corresponding linear tag valid bits remain set. During a subsequent access to a cache entry as determined by the linear address, a set linear tag valid bit along with a cleared valid physical translation bit indicates to cache control circuit 170 that TLB 420 has been updated. Upon detecting this condition, cache control circuit 170 accesses the physical tag 416 corresponding to the accessed cache entry in physical tag portion 390 while accessing the entry in TLB array 420 in which the linear to physical address for this cache entry is translated. If the physical address as translated by TLB 420 matches the physical tag entry 416 corresponding to the cache entry, then a valid physical address translation is still present and this particular entry of TLB array 420 was not updated. I.e., the physical address translation is successful. When the physical address translation is successful, the valid physical translation bit for this entry is again set to indicate that the linear and physical tags provide a valid physical translation. When the physical translation check is successful, then the tagged entry and stored instruction may be used within one cycle of the TLB lookup and the hit on the physical tags. This procedure prevents the external reloading of instruction cache 104 whenever the TLB 420 is updated, except for any newly referenced addresses.

If the physical address as translated by TLB 420 does not match the physical tag entry 416 corresponding to the cache entry, then a valid physical address translation is not present and this particular entry of TLB array 420 was updated. Accordingly, the access is treated as a cache miss and the process for loading a new entry into the cache is initiated.

Figure 11:
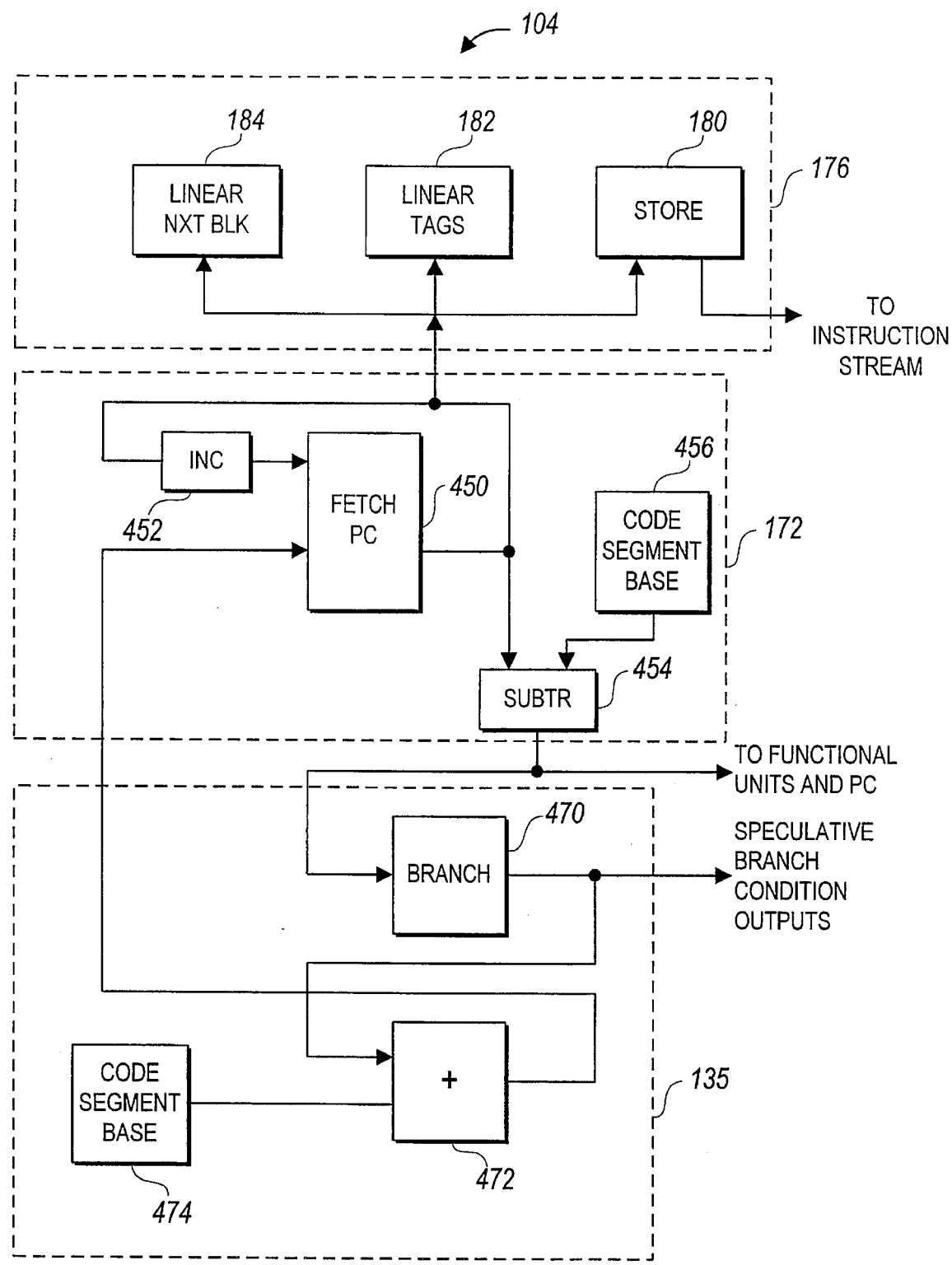
FIG. 11 is a block diagram of using the linearly addressed instruction cache of FIG. 2 when speculatively executing instructions.

Referring to FIG. 11, the interaction between branch section 135 and address circuit 172 and store array 172 of linear addressable instruction cache 104 when processor 100 is speculatively executing instructions is shown. Address circuit 176 includes speculative instruction fetch pointer circuit 450 which is coupled to instruction cache array 176; the output of fetch pointer circuit 450 is provided as an input to fetch pointer 450 via address incrementer circuit 452. Address circuit 172 also includes subtraction circuit 454 which is coupled to code segment base register 456. Subtraction circuit 454 is also coupled with instruction fetch pointer 450. Subtraction circuit 454 provides the logical address to the functional units and the program counter as well as to branch section 135. Branch section 135 includes branch circuit 470 as well as adder 472 and code segment register 474.

Instruction fetch pointer 450 receives an incremented linear address from address incrementer circuit 452 which increments the current linear fetch pointer address. Alternately, if a speculative branch occurs, then instruction fetch pointer 450 receives a linear speculative fetch pointer address from branch section 135. Branch section 135 maintains a linear speculative counter which represents a speculative next counter by taking the logical speculative next counter from branch circuit 470 and adding, with adder circuit 472, the code segment base from code segment base register 474. This speculative linear counter is checked by fetch pointer 450 against the segment limits to insure that the requested linear address is valid.

The code segment base which is stored in code segment base register 456 is used by subtraction circuit 454 to re-form the logical address which is provided to the functional units and to the program counter. More specifically, subtraction circuit 454 subtracts the segment base from the linear address which is provided by speculative fetch pointer circuit 450 to provide the logical address which is provided to the functional units and program counter. Because the linear address as generated by fetch pointer 450 is valid, there in no checking necessary to assure that the logical address is valid. Accordingly, when a speculative branch occurs, the speculative instruction stored in instruction cache 104 is provided along with the corresponding logical address to the functional units.

When the segment register is updated (i.e., when microprocessor 100 changes segments), cache 104 does not have to be updated since information is stored in the cache relative to the linear address. Accordingly, segment register updates, which are common in certain operating modes of microprocessor 100, do not require the cache to be flushed of linear addresses and thus do not impact performance.

Referring to FIGS. 1 and 5–10, the operation of data cache 150 is similar to that of instruction cache 104. When a data value that is not stored in cache 150 is requested by load/store functional unit 135, then a cache miss results. Upon detecting a cache miss, the requested value is loaded into an entry of data cache 150. More specifically, load/store functional unit 134 translates the logical address for the value to a linear address. This linear address is provided to memory management unit 164. The linear address of the value is checked against the linear tag portion of TLB array 420 by TLB compare circuit 422 to determine whether there is a TLB hit. If so, then the upper order bits of the physical address after translation from the corresponding linear address is written into the entry of data physical tag array portion 392 which corresponds to the column select bits and cache block index bits of the linear address. The data linear tag array 350–353 which corresponds to the column select bits of the linear tag and the cache block index of the linear address bits is written with the linear tag from TLB array 420. If there is not a TLB hit, then TLB 420 is updated by memory management unit 164 to include the address of the requested value so that a TLB hit results and then the real page number is written to data physical tag portion 392 as discussed.

A pre-fetch request is then made by load/store functional unit 134 to the external memory and the value which is stored in the external memory at the physical address which corresponds to the linear address is retrieved from the external memory. This value is stored in the line and column of store array 312 which corresponds to the line and column locations of the value's physical and linear tags which are stored in the respective physical and linear tag arrays. The corresponding physical tag valid bit in the physical tag array 392 is set to indicate that the physical tag is valid. Additionally, the corresponding data valid bit, linear tag valid bit and valid physical translation bit in the linear tag array 310 are also set to indicate that the entry corresponding to the linear tag is valid, that the linear tag is valid and that the entry provides a successful physical translation.

When the logical address for this value is again requested by a functional unit, load/store functional unit 135 converts the logical address to the linear address which provides a match of the linear tags in linear address tag array 310 with the requested address. Because the valid bit is set and the valid physical translation bit is set, a linear address hit occurs, and the entry which is stored in the corresponding line of data store array 304 is forwarded to the requesting functional unit. During the access by load/store functional unit 134, there is no need to access either the physical address tag circuit 162 or TLB circuit 164 since the valid physical translation bit is set indicating that the entry has a valid physical translation. This process is repeated for each data cache access unless TLB 420 is updated.

When a line of TLB 420 which includes a data entry translation is updated, the interaction between TLB 420 and data cache 150 is the same as the interaction between TLB 420 and instruction cache 104 for when a line of TLB 420 which includes an instruction entry translation is updated.

Bus watching from an external bus, such as the 486 XL bus, is accomplished by accessing the physical tags. By using the physical tags, the functional units may continue accessing the caches during bus activity even though instruction cache 104 and data cache 150 do not include separate ports for bus watching.

A bus watching, i.e., snooping, operation is initiated when bus interface unit 160 determines that the external bus is owned by another master (not shown) and a read or write indication is received by bus interface unit 160. The physical address of the external bus is provided to physical tag circuits 390, 392 to determine whether a match of any of the columns occurs. If no match occurs, during either a bus watching read or a bus watching write, then the internal snoop is completed and processor 100 does not participate in the bus watching operation.

If a hit occurs, then a copy of the physical address being snooped is held by processor 100 and a hit indication is immediately issued to the device which owns the external bus. This hit indication is in any conventional state that the multiprocessing snooping protocol accepts. The cache, either data cache 150 or instruction cache 104, that corresponds to this hit is then halted and inspected.

If the address provides a data cache hit as determined by physical tags 408–411, and the request is a read, then the data physical tag corresponding to the column that is hit is read using the least significant bits of the physical address to access the corresponding shared and modified bits. If the data is modified, as indicated by a set modified bit, then the data which is resident in the data cache store array, as accessed by the column select bits and cache index bits from the physical address's least significant bits, is driven external to processor 100 via bus interface unit 160. The shared bit is then set to indicate that this block is now contained in another cache. If the data is not modified, as indicated by a cleared modified bit, and the data is not shared, as indicated by a cleared shared bit, then the shared bit is set to indicate that this block is now contained in another cache. If the data is not modified, as indicated by a cleared modified bit, and the data is shared, as indicated by a set shared bit, then the shared bit remains set, the hit indication is issued to indicate that the requested block is stored within the cache.

If the address provides a data cache hit as determined by physical tags 408–411, and the request is a bus watching write, then the data physical tag corresponding to the column that is hit is accessed using the least significant bits of the physical address to access the corresponding shared and modified bits. If the data is modified, as indicated by a set modified bit, then the data which is resident in the data cache store array, as accessed by the column select bits and cache index bits from the physical address's least significant bits, is written to memory and updated with the write data from the external device. The shared bit is then set to indicate that this block is now contained in another cache and the modified bit is cleared to indicate that the data which is stored is no longer used externally. If the data is not modified, as indicated by a cleared modified bit, and the data is not shared, as indicated by a cleared shared bit, then the shared bit is set to indicate that this block is now contained in another cache and the data which is written on the external bus is written to the data cache. If the data is not modified, as indicated by a cleared modified bit, and the data is shared, as indicated by a set shared bit, then the shared bit remains set, and the data is written to the line of the data cache.

If the address provides an instruction cache hit, then no modified data is possible. If the address provides an instruction cache hit as determined by physical tags 400–403, and the request is a read, then the instruction physical tag corresponding to the column that is hit is read using the least significant bits of the physical address to access the corresponding shared and modified bits. If the instruction is not shared, as indicated by a cleared shared bit, then the shared bit is set to indicate that this block is now contained in another cache. If the instruction is shared, as indicated by a set shared bit, then the shared bit remains set, the hit indication is issued to indicate that the requested block is stored within the cache.

Bus watching writes to the instruction cache cause the instruction cache line which is written to be invalidated. More specifically, if the bus watching address provides an instruction cache hit as determined by instruction physical tags 400–403, and the request is a bus watching write, then the instruction physical tag corresponding to the column that is hit is accessed using the least significant bits of the physical address to access the corresponding shared and modified bits. If the instruction is not shared, as indicated by a cleared shared bit, then the instruction cache entry is cleared by clearing the valid bits in both the physical and linear tag arrays because the modification of the code stream invalidates the instructions which are stored in instruction cache 104 and the disturbance to the pre-decode state of that block. If the instruction is shared, as indicated by a set shared bit, then the instruction cache entry is cleared by clearing the valid bits in both the physical and linear tag arrays because the modification of the code stream invalidates the instructions which are stored in instruction cache 104.

Referring again to FIG. 10, microprocessor 100 controls instruction cache 104 and data cache 150 to prevent aliasing, i.e., having two linear addresses map to the same physical address. With the architecture of instruction cache 104 and data cache 150, the least significant bits of linear address 188 and physical address 418 correspond to each other. These least significant bits are used to address a particular line of respective linear and physical tag arrays and the remaining most significant bits are used to compare against respective tags. Accordingly, any aliased linear address could only reside in one of the columns of the line which is accessed with these least significant bits. With this understanding, writes to the caches are controlled to prevent aliasing.

In operation, when a miss is detected on the linear tags of either instruction cache 104 or data cache 150, the corresponding physical tags are accessed after memory management unit 164 translates the linear address to a physical address. After linear address 188 is translated to a physical address 418, if there is a hit on the physical tags, then the same physical address could potentially have two different linear addresses. However, the column select bits from the physical address which provided the hit on the physical tags is provided to the linear tag array and the entry is written to the column in the cache array corresponding to the column which provided the physical tag hit. Accordingly, by assuming that the most recently requested address addresses the preferred entry, the entry corresponding to the address that was potentially aliased overwrites the existing entry. Using this procedure with the architecture of caches 104, 150 inherently prevents multiple linear addresses from mapping to the same physical address.

OTHER EMBODIMENTS

Other embodiments are within the following claims.

For example, the physical tag arrays for the instruction and data caches may be incorporated as part of their respective caches, as compared to being in a separate physical tag array.

Also for example, the caches may be arranged to include respective translation lookaside buffers.

Also for example, the TLB update procedure may be further enhanced by providing local storage of the real page number of entries on which the TLB update procedure has been performed. Because entries within the same page use the same TLB translation, when subsequent accesses to the same page occur, it may be assumed that the physical tag array has the correct physical page and the physical tag valid bits to these subsequent entries may be set. Accordingly, when a prior access to the same page has a successful translation, it is not necessary to stall the pipeline for one cycle while accessing TLB 238 for subsequent cycles.

What is claimed is:

1. A processor for processing information, the processor interacting with a device external to the processor using physical addresses, the processor comprising:

a functional unit, said functional unit being addressed using logical addresses;

a cache for temporarily storing information for use by said functional unit, said cache being addressed using linear addresses;

a first translation circuit for translating physical addresses to linear addresses and linear addresses to physical addresses to allow the device external to the processor to communicate with said cache, said first translation circuit being coupled between said cache and the device external to the processor;

a second translation circuit for translating linear addresses to logical addresses and logical addresses to linear addresses to allow said functional unit to communicate with said cache, said second translation circuit being coupled between said functional units and said cache.

2. The processor of claim 1 wherein:

the cache includes an instruction cache for temporarily storing instructions for use by the functional units and a data cache for temporarily storing data for use by the functional units.

3. The processor of 2 further comprising:

an instruction physical tag array having a plurality of instruction physical address tag locations for storing a corresponding plurality of instruction physical address tags, said plurality of instruction physical address tag locations corresponding to a plurality of lines of said instruction cache, each instruction physical address tag location storing an instruction physical address tag indicating a physical address of the information stored in a corresponding line of said instruction cache; and a data physical tag array having a plurality of data physical address tag locations for storing a corresponding plurality of data physical address tags, said plurality of data physical address tag locations corresponding to a plurality of lines of said data cache, each data physical address tag location storing a data physical address tag indicating a physical address of the information stored in a corresponding line of said data cache.

4. The processor of claim 3 further comprising:

a translation lookaside buffer having a plurality of linear address tag value locations and a corresponding plurality of physical address tag value locations, each of said plurality of linear address tag value locations storing a linear address tag value indicating a linear address and each of said corresponding plurality of physical address tag value locations storing a corresponding physical address tag value indicating a corresponding physical address, said corresponding physical address being a translation of said linear address said translation lookaside buffer being accessed by both said instruction cache and said data cache.

5. The processor of claim 1 wherein the cache includes:

a store array having a plurality of lines for temporarily storing information; and a linear tag array having a plurality of linear address tag locations for storing a corresponding plurality of linear address tags, said plurality of linear address tag locations corresponding to said plurality of lines of said store array, each linear address tag location storing a linear address tag indicating a linear address of the information stored in a corresponding line of said store array.

6. The processor of 5 further comprising:

a valid information array having a plurality of valid information signal locations for storing a corresponding plurality of valid information signals, said plurality of valid information signal locations corresponding to said plurality of lines of said store array, each said valid information signal indicating whether valid information is stored in a corresponding line of said store array.

7. The processor of claim 6 wherein said linear tag array includes said valid information array.

8. The processor of claim 5 wherein:
said cache includes a plurality of columns; and
each of said plurality of columns includes a respective store array and linear tag array.

9. The processor of claim 8 further comprising:
a plurality of physical tag arrays corresponding to said plurality of columns,
each physical tag array having a plurality of physical address tag locations for storing a corresponding plurality of physical address tags, said plurality of physical address tag locations corresponding to said plurality of lines of said store array, each physical address tag location storing a physical address tag indicating the physical address of the information stored in a corresponding line of said store array.

10. The processor of claim 9 further comprising:
a unified translation lookaside buffer, said unified translation lookaside buffer having a plurality of linear address tag value locations and a corresponding plurality of physical address tag value locations, each of said plurality of linear address tag value locations storing a linear address tag value indicating a linear address and each of said corresponding plurality of physical address tag value locations storing a corresponding physical address tag value indicating a corresponding physical address, said corresponding physical address being a translation of said linear address.

11. The processor of 1 further comprising:
a physical tag array having a plurality of physical address tag locations for storing a corresponding plurality of physical address tags, said plurality of physical address tag locations corresponding to a plurality of lines of said cache, each physical address tag location storing a physical address tag indicating a physical address of the information stored in a corresponding line of said cache.

12. The processor of claim 11 further comprising;
a physical tag valid information array having a plurality of physical tag valid information signal locations for storing a corresponding plurality of physical tag valid information signals, said plurality of physical tag valid information signal locations corresponding to said plurality of lines of said cache each said physical tag valid information signal indicating whether a valid physical tag is stored in a corresponding line of said physical tag array.

13. The processor of claim 12 wherein said physical tag array includes said physical tag valid information array.

14. The processor of claim 1 further comprising:
a translation lookaside buffer having a plurality of linear address tag value locations and a corresponding plurality of physical address tag value locations, each of said plurality of linear address tag value locations storing a linear address tag value indicating a linear address and each of said corresponding plurality of physical address tag value locations storing a corresponding physical address tag value indicating a corresponding physical address, said corresponding physical address being a translation of said linear address.

15. The processor of claim 14 further comprising:
a valid physical translation information array having a plurality of valid physical translation information signal locations for storing a corresponding plurality of valid physical translation information signals, said plurality of valid physical translation information signal locations corresponding to lines of said cache, each said valid physical translation information signal indicating whether information stored in a corresponding line of said cache provides a successful physical tag hit.

16. The processor of claim 15 wherein said linear tag array includes said valid physical translation information array.

17. A method of using a cache within a processor which includes a plurality of functional units which are accessed using logical addresses, the processor interacting with a device external to the processor using physical addresses, the method comprising:
addressing the cache using linear addresses;
translating physical addresses to linear addresses and linear addresses to physical addresses to allow devices external to the processor to communicate with the cache; and
translating linear addresses to logical addresses and logical addresses to linear addresses to allow the functional units to communicate with the cache.

18. A method of preventing aliasing from occurring when using a cache within a processor which includes a functional unit which is accessed using logical addresses, the processor interacting with a device external to the processor using physical addresses having more significant bits and least significant bits, the method comprising:
addressing the cache using linear addresses having more significant bits and least significant bits, the cache including a plurality of columns, each column including a plurality of lines, the plurality of lines of each column corresponding to the plurality of lines of the other columns;
translating physical addresses to linear addresses and linear addresses to physical addresses to allow devices external to the processor to communicate with the cache, the translating allowing the least significant bits of the linear address to correspond to the least significant bits of the physical address;
translating linear addresses to logical addresses and logical addresses to linear addresses to allow the functional unit to communicate with the cache; and
controlling the addressing of the cache so that the least significant bits of the linear address access a particular line of each column of the cache and causing information corresponding to a physical address to be written in only one column of the particular line of the cache.

19. A apparatus for processing information, comprising:
an external memory for holding the information, said external memory being addressed using physical addresses;
a processor coupled with the external memory via a processor bus, the processor including a plurality of functional units, said functional units being addressed using logical addresses;
a cache for temporarily storing information for use by said plurality of functional units, said cache being addressed using linear addresses; and
a first translation circuit for translating linear addresses to logical addresses and logical addresses to linear addresses to allow said functional units to communicate with said cache, said first translation circuit being coupled between said functional units and said cache; and
a second translation circuit for translating physical addresses to linear addresses and linear addresses to physical addresses to allow said external memory to communicate with said cache, said second translation circuit being coupled between said external memory and said cache.

20. The apparatus of claim 19 wherein:

the cache includes an instruction cache for temporarily storing instructions for use by the functional units and a data cache for temporarily storing data for use by the functional units.

21. The apparatus of 20 further comprising:

an instruction physical tag array having a plurality of instruction physical address tag locations for storing a corresponding plurality of instruction physical address tags, said plurality of instruction physical address tag locations corresponding to a plurality of lines of said instruction cache, each instruction physical address tag location storing an instruction physical address tag indicating a physical address of the information stored in a corresponding line of said instruction cache; and a data physical tag array having a plurality of data physical address tag locations for storing a corresponding plurality of data physical address tags, said plurality of data physical address tag locations corresponding to a plurality of lines of said data cache, each data physical address tag location storing a data physical address tag indicating a physical address of the information stored in a corresponding line of said data cache.

22. The apparatus of claim 21 further comprising:

a translation lookaside buffer having a plurality of linear tag value locations and a corresponding plurality of physical address locations, each of said plurality of linear tag value locations storing a linear tag value indicating a linear address and each of said corresponding plurality of physical address locations storing a corresponding physical address, said corresponding physical address being a translation of said linear address said translation lookaside buffer being accessed by both said instruction cache and said data cache.

23. The apparatus of claim 19 wherein the cache includes:

a store array having a plurality of lines for temporarily storing information; and a linear tag array having a plurality of linear address tag locations for storing a corresponding plurality of linear address tags, said plurality of linear address tag locations corresponding to said plurality of lines of said store array, each linear address tag location storing a linear address tag indicating a linear address of the information stored in a corresponding line of said store array.

24. The apparatus of 23 further comprising:

a valid information array having a plurality of valid information signal locations for storing a corresponding plurality of valid information signals, said plurality of valid information signal locations corresponding to said plurality of lines of said store array, each said valid information signal indicating whether valid information is stored in a corresponding line of said store array.

25. The apparatus of claim 24 wherein said linear tag array includes said valid information array.

26. The cache of claim 23 wherein:

said cache includes a plurality of columns; and each of said plurality of columns includes a respective store array and linear tag array.

27. The apparatus of claim 26 further comprising:

a plurality of physical tag arrays corresponding to said plurality of columns, each physical tag array having a plurality of physical address tag locations for storing a corresponding plurality of physical address tags, said plurality of physical address tag locations corresponding to said plurality of lines of said store array, each physical address tag location storing a physical address tag indicating the physical address of the information stored in a corresponding line of said store array.

28. The processor of claim 27 further comprising:

a unified translation lookaside buffer, said unified translation lookaside buffer having a plurality of linear address locations and a corresponding plurality of physical address locations, each of said plurality of linear address locations storing a linear address and each of said corresponding plurality of physical address locations storing a corresponding physical address, said corresponding physical address being a translation of said linear address.

29. The apparatus of 19 further comprising:

a physical tag array having a plurality of physical address tag locations for storing a corresponding plurality of physical address tags, said plurality of physical address tag locations corresponding to a plurality of lines of said cache, each physical address tag location storing a physical address tag indicating a physical address of the information stored in a corresponding line of said cache.

30. The apparatus of claim 29 further comprising:

a physical tag valid information array having a plurality of physical tag valid information signal locations for storing a corresponding plurality of physical tag valid information signals, said plurality of physical tag valid information signal locations corresponding to said plurality of lines of said cache each said physical tag valid information signal indicating whether a valid physical tag is stored in a corresponding line of said physical tag array.

31. The apparatus of claim 30 wherein said physical tag array includes said physical tag valid information array.

32. The apparatus of claim 19 further comprising:

a translation lookaside buffer having a plurality of linear tag value locations and a corresponding plurality of physical address locations, each of said plurality of linear tag value locations storing a linear tag value indicating a linear address and each of said corresponding plurality of physical address locations storing a corresponding physical address, said corresponding physical address being a translation of said linear address.

33. The apparatus of claim 19 further comprising:

a valid physical translation information array having a plurality of valid physical translation information signal locations for storing a corresponding plurality of valid physical translation information signals, said plurality of valid physical translation information signal locations corresponding to lines of said cache, each said valid physical translation information signal indicating whether information stored in a corresponding line of said cache provides a successful physical tag hit.

34. The apparatus of claim 33 wherein said linear tag array includes said valid physical translation information array.

35. A processor for processing information, the processor interacting with a device external to the processor using physical addresses, the processor comprising:

a functional unit, said functional unit being addressed using logical addresses;

a cache including a plurality of lines for temporarily storing information for use by said functional unit, said cache being addressed using linear addresses;

a first translation circuit for translating physical addresses to linear addresses and linear addresses to physical addresses to allow the device external to the processor to communicate with said cache, said first translation circuit being coupled between said cache and the device external to the processor;

a second translation circuit for translating linear addresses to logical addresses and logical addresses to linear addresses to allow said functional unit to communicate with said cache, said second translation circuit being coupled between said functional unit and said cache;

a physical tag array having a plurality of physical address tag locations for storing a corresponding plurality of physical address tags, said plurality of physical address tag locations corresponding to said plurality of lines of said cache, each physical address tag location storing a physical address tag indicating a physical address of the information stored in a corresponding line of said cache; and a translation lookaside buffer having a plurality of linear tag value locations and a corresponding plurality of physical tag value locations, each of said plurality of linear tag value locations storing a linear tag value indicating a linear address and each of said corresponding plurality of physical tag value locations storing a corresponding physical tag value indicating a corresponding physical address, said corresponding physical address being a translation of said linear address.

36. The processor of claim 35 wherein:

the cache includes an instruction cache for temporarily storing instructions for use by the functional unit and a data cache for temporarily storing data for use by the functional unit.

37. The processor of claim 36 wherein said translation lookaside buffer is a unified translation lookaside buffer.

38. A processor for processing information, the processor interacting with a device external to the processor using physical addresses, said processor being configured to execute an X86 instruction set, the processor comprising:

a functional unit, said functional unit being addressed using logical addresses;

a cache for temporarily storing information for use by said functional unit, said cache being addressed using linear addresses;

a first translation circuit for translating physical addresses to linear addresses and linear addresses to physical addresses to allow the device external to the processor to communicate with said cache, said first translation circuit being coupled between said cache and the device external to the processor;

a second translation circuit for translating linear addresses to logical addresses and logical addresses to linear addresses to allow said functional unit to communicate with said cache, said second translation circuit being coupled between said functional unit and said cache.

39. The processor of claim 38 wherein:

the cache includes an instruction cache for temporarily storing instructions for use by the functional unit.

40. The processor of 39 further comprising:

an instruction physical tag array having a plurality of instruction physical address tag locations for storing a corresponding plurality of instruction physical address tags, said plurality of instruction physical address tag locations corresponding to a plurality of lines of said instruction cache, each instruction physical address tag location storing an instruction physical address tag indicating a physical address of the information stored in a corresponding line of said instruction cache.

41. The processor of claim 38 wherein:

the cache includes a data cache for temporarily storing data for use by the functional unit.

42. The processor of 41 further comprising:

a data physical tag array having a plurality of data physical address tag locations for storing a corresponding plurality of data physical address tags, said plurality of data physical address tag locations corresponding to a plurality of lines of said data cache, each data physical address tag location storing a data physical address tag indicating a physical address of the information stored in a corresponding line of said data cache.

43. The processor of claim 38 further comprising:

a translation lookaside buffer having a plurality of linear tag value locations and a corresponding plurality of physical tag value locations, each of said plurality of linear tag value locations storing a linear tag value indicating a linear address and each of said corresponding plurality of physical tag value locations storing a corresponding physical tag value indicating a corresponding physical address, said corresponding physical address being a translation of said linear address.

44. The processor of claim 38 further comprising:

a physical tag array having a plurality of physical address tag locations for storing a corresponding plurality of physical address tags, said plurality of physical address tag locations corresponding to a plurality of lines of said cache, each physical address tag location storing a physical address tag indicating a physical address of the information stored in a corresponding line of said cache.

45. A cache system for temporarily storing information for use by a functional unit of a microprocessor, the functional unit of the microprocessor operating using logical addresses, the microprocessor accessing devices external to the microprocessor using physical addresses, the microprocessor translating between logical addresses, linear addresses and physical addresses, the cache system comprising:

a store array having a plurality of lines for temporarily storing information;

a linear tag array having a plurality of linear address tag locations for storing a corresponding plurality of linear address tags, said plurality of linear address tag locations corresponding to said plurality of lines of said store array, each linear address tag location storing a linear address tag indicating a linear address of the information stored in a corresponding line of said store array;

a physical tag array having a plurality of physical address tag locations for storing a corresponding plurality of physical address tags, said plurality of physical address tag locations corresponding to said plurality of lines of said store array, each physical address tag location storing a physical address tag indicating a physical address of the information stored in a corresponding line of said store array; and a translation lookaside buffer having a plurality of linear tag value locations and a corresponding plurality of physical tag value locations, each of said plurality of linear tag value locations storing a linear tag value indicating a linear address and each of said corresponding plurality of physical tag value locations storing a corresponding physical tag value indicating a corresponding physical address, said corresponding physical address being a translation of said linear address.

* * * * *